3,751,477
PREPARATION OF HYDROPEROXIDES
Donald L. Roberts, Winston-Salem, N.C., assignor to R. J. Reynolds Tobacco Company, Winston-Salem, N.C.
No Drawing. Filed Mar. 13, 1969, Ser. No. 807,072
Int. Cl. C07c 49/43
U.S. Cl. 260—586 B                    6 Claims

ABSTRACT OF THE DISCLOSURE

Acyclic or cyclic methyl substituted trisubstituted olefins treated with triarylphosphite-ozone adducts yield α-methylene hydroperoxides.

---

This invention relates to organic syntheses and more particularly to the treatment of acyclic or cyclic methyl substituted trisubstituted olefins. It is known that triarylphosphites react with ozone at low temperatures to form adducts. For example, the reaction of ozone with triarylphosphites to form adducts is discussed by Quenton E. Thompson in the Journal of the American Chemical Society, 83, 845–851 (1961). Triarylphosphite-ozone adducts can be prepared by contacting a triarylphosphite, preferably dissolved in a suitable solvent, with ozone at temperatures below —40° C. Suitable solvents for carrying out the adduct formation are halogen-containing hydrocarbon solvents such as methylene chloride, chloroform, trichlorofluoromethane, dichlorodifluoromethane and the like.

It has now been found that triarylphosphite-ozone adducts when utilized to treat trisubstituted olefins yield substantially exclusively allylic hydroperoxides which, among others, find use as chemical intermediates. An unexpected feature of this discovery is the fact that the triarylphosphite-ozone adducts, when utilized to treat methyl substituted trisubstituted olefins, produce almost exclusively one product, namely α-methylene alkyl hydroperoxides, in contrast to the mixture of products usually produced by treating trisubstituted olefins with a source of singlet oxygen such as oxygen produced by photosensitization or by reaction of a hypochlorite and hydrogen peroxide.

This specificity for α-methylene alkyl hydroperoxide formation is shown by data in Table 1:

The olefins which are treated with the triarylphosphite-ozone adducts to form hydroperoxides in accordance with this invention are acyclic or cyclic methyl substituted trisubstituted olefins. Representative acyclic olefins are 2-methyl-2-butane, 2-methyl-2-pentene, 3-methyl-2-pentene, 2-methyl-3-hexene, 2,5-dimethyl-2-hexene, 2,4-dimethyl-2-pentene, geraniol, farnesol and the like. Representative cyclic olefins are 1-methylcyclohexene, 1-methylcyclopentene, dipentene, 1-p-menthene, 1-m-menthene, 6-m-menthene, 2-pinene, 2-carene, 3-carene, α-cedrene, 1-methylcycloheptene, 2 - (4-methylcyclohex-3-en-1-yl)-6-methylheptan-4-one, α-terpineol, caryophyllene and the like.

The syntheses of this invention are carried out by contacting a said olefin, preferably dissolved in an inert solvent, with a triarylphosphite-ozone adduct. This treatment can be conducted in any suitable equipment at temperatures ranging from —60° C. to 10° C., preferably —40° to —20° C. for periods ranging from 0.5 to 24 hours. Inert solvents suitable for carrying or dissolving the olefins include, for example, chloroform, methylene chloride, carbon tetrachloride, pentane, hexane, cyclohexane, petroleum ethers and the like.

The hydroperoxides formed by treating the olefins with a triarylphosphite-ozone adduct are generally reduced by conventional means to allylic alcohols without separation from the reaction mixture. Such conventional reductive reagents as triphenylphosphine, triethyl phosphite, sodium borohydride, potassium iodide, sodium sulfite and lithium aluminum hydride can be employed for this purpose. Alternatively, the so-formed hydroperoxides can be converted to α,β-unsaturated ketones by treatment with bases such as, for example, sodium hydroxide, potassium hydroxide, barium hydoxide, sodium carbonate, alumina, etc.

Representative triarylphosphites which can be reacted with ozone to form adducts include, for example, triphenylphosphite, tris - (p-tolyl)phosphite, tris-(p-butylphenyl)phosphite, tris-(p-methoxyphenyl)phosphite, tris-(p-chlorophenyl)phosphite, tris-(p-nitrophenyl)phosphite, tris - (p - aminophenyl)phosphite, tris-(p-t-butylphenyl)phosphite, tris-(m-ethylphenyl)phosphite, tris-(p-fluorophenyl)phosphite and tris-(2,4-dimethylphenyl)phosphite.

The following examples illustrate the present invention.

EXAMPLE I

Triphenylphosphite (15.5 g., 13 ml., 0.05 mole) was dissolved in 100 milliliters of methylene chloride and the solution was cooled to below —50° C. Ozone was bubbled into the cooled solution until 0.05 mole of ozone was absorbed as was indicated by the blue-green color of the solution. The excess ozone in the solution was purged with nitrogen.

The procedure of this example was employed for preparation of the phosphite-ozone reagents utilized in obtaining the data summarized in Table 1.

TABLE 1

| Olefin | Products [1] | Yields by methods, percent Phosphite ozone | Photosensitized oxygenation | Hypochlorite peroxide, percent |
|---|---|---|---|---|
| 2-methyl-2-butene | 3-methyl-3-buten-2-ol | 85 | 48 | 49 |
|  | 2-methyl-3-buten-2-ol | 15 | 52 | 51 |
| 1-methyl-1-cyclohexene | 2-methylene-1-cyclohexanol | 94 | 44 | 44 |
|  | 1-methyl-2-cyclohexen-1-ol | 6 | 36 | 36 |
|  | 2-methyl-2-cyclohexen-1-ol |  | 20 | 20 |
| 1-p-menthene | 1(7)-p-menthen-2-ol | 90 | 39 |  |
|  | 2-p-menthen-1-ol | 10 | 43 |  |
|  | 6-p-menthen-2-ol |  | 18 |  |
| Limonene (1,8-p-menthadiene) | 1(7),8-p-menthadien-2-ol | 85 | 42 | 39 |
|  | 2,8-p-menthadien-1-ol | 15 | 44 | 44 |
|  | 6,8-p-menthadien-2-ol |  | 13 | 17 |
| 3-carene | 3(10)-caren-4-ol | 96 | 23 |  |
|  | 4-caren-3-ol | Trace | 50 |  |
|  | 2-caren-4-ol | Trace | 27 |  |
| 2-pinene | 2(10)-pinen-3-ol | 84 | 94 | 9 |
|  | 3-pinen-2-ol | 16 | Trace | 50 |
|  | 2-pinen-4-ol |  | Trace | 31 |
|  | 2-pinen-10-ol | 0 |  | 10 |

[1] The products were alcohols obtained by reduction of the hydroperoxides and analyzed by gas chromatography.

EXAMPLE II

Following the procedure of Example I, the following substituted arylphosphite-ozone adducts were prepared:

Tris-(p-tolyl)phosphite
Tris-(p-butylphenyl)phosphite
Tris-(p-methoxyphenyl)phosphite
Tris-(p-chlorophenyl)phosphite

EXAMPLE III

Following the procedure of Example I, tris-(p-nitrophenyl)phosphite-ozone adduct was prepared using one-tenth the concentration of the phosphite.

EXAMPLE IV

Following the procedure of Example I, triarylphosphite-ozone adducts are prepared using as solvents chloroform, trichlorofluoromethane and dichlorodifluoromethane.

EXAMPLE V

To a cold (—70°) solution of triphenylphosphite-ozone adduct (0.05 mole) was added 7 grams of 2-methyl-2-butene in 25 milliliters of methylene chloride. The solution was warmed to —30° for 3 hours, then the cooling baths were removed. After standing overnight, the material was reduced with triphenylphosphine and then distilled; 0.28 gram of 3-methyl-3-buten-2-ol, boiling point 47°/19 millimeters of mercury, was isolated and identified by comparison of its infrared spectrum with that of a known sample.

This procedure was employed for the oxidations with phosphite-ozone adduct summarized in Table 1.

EXAMPLE VI

To a cold (—70° C.) solution of triphenylphosphite-ozone adduct was added 15.4 grams of geraniol in 25 milliliters of methylene chloride. The solution was warmed to —30° C. for 3 hours, then the cooling baths were removed. After standing overnight the material was reduced with triphenylphosphine and then distilled. 11.18 grams of geraniol was recovered along with 2.10 grams of a product which was shown by nuclear magnetic resonance spectrum to be 3-methylene-7-methyl-6-octene-1,2-diol.

EXAMPLE VII

A solution of 20 grams of tris-(p-methoxyphenyl)phosphite in 100 milliliters of methylene chloride was cooled to —50° C. Ozone was bubbled into the cooled solution until 0.05 mole of ozone was absorbed.

Fourteen grams of limonene in 25 milliliters of methylene chloride was added slowly to a cold solution (—70° C.) of the tris-(p-methoxyphenyl)phosphite-ozone adduct. After warming to room temperature overnight the hydroperoxide was reduced and the solution distilled. Eleven grams of limonene were recovered in addition to 0.73 gram of 1(7),8-p-menthadien-2-ol which was identified by infrared and nuclear magnetic resonance spectra.

EXAMPLE VIII

The procedure of Example VII was repeated using an ozone adduct from 1 gram of tris-(p-nitrophenyl)phosphite in 150 milliliters of methylene chloride and 1 gram of limonene. Gas chromatographic analysis showed the production of 1(7),8-p-menthadien-2-ol in approximately 10% yield.

EXAMPLE IX

The product 1(7),8-p-menthadien-2-ol produced as in Examples VII and VIII can be converted to perillaldehyde which can then be converted to perillartine which finds use as a synthetic sweetener. These conversions are illustrated by the following reaction:

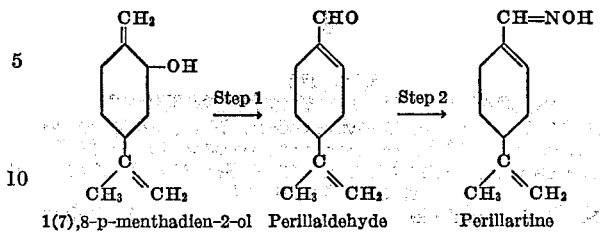

1(7),8-p-menthadien-2-ol   Perillaldehyde   Perillartine

Step 1 in the above reaction is accomplished by the use of chromic acid-sulfuric acid reagent according to the procedure of F. Porsch reported in Dragoco Reports, 149–152 (1964).

In Step 2, the perillaldehyde is converted to the oxime by known procedure as, for example, the procedure reported in Chemical Abstracts, 14, 2528 (1920).

EXAMPLE X

To the ozone adduct from 21 grams of tris-(p-chlorophenyl)phosphite in 100 milliliters of methylene chloride was added 20 grams of α-cedrene in 25 milliliters of methylene chloride at a temperature of —50° C. After warming to room temperature, the mixture was reduced with triphenylphosphine. Gas chromatographic analysis followed by distillation showed a 5% conversion of α-cedrene to cedr-8(15)-en-9α-ol. The product crystallized from acetone and hexane and melted at 128° (reported melting point 129.5°).

EXAMPLE XI

Following the procedure of Example X, a triphenylphosphite-ozone adduct was employed to treat α-cedrene. This treatment resulted in a 23% conversion of α-cedrene and a 50% yield of cedr-8(15)-en-9α-ol.

EXAMPLE XII

The cedr-8(15)-en-9α-ol can be oxidized using chromic oxide to the corresponding aldehyde which in turn can be oxidized using silver oxide to cedrene carboxylic acid which finds use as a plant growth stimulator. These conversions are illustrated by the following:

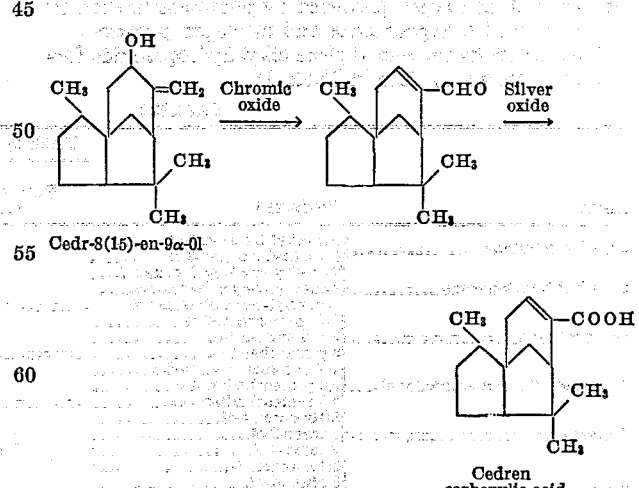

Cedr-8(15)-en-9α-ol

Cedren carboxylic acid

Those modifications and equivalents which fall within the spirit of the invention are to be considered a part thereof.

I claim:

1. A process for preparing an α-methylene alkyl hydroperoxide which comprises treating with a triarylphosphite-ozone adduct in an inert solvent at a temperature in the range of —60° C. to 10° C. a methyl substituted trisubstituted olefin selected from the group consisting of 2- methyl-2-butene, 2-methyl-2-pentene, 3-methyl-2-pentene, 2-methyl-2-hexene, 2,5-dimethyl-2-hexene, 2,4-dimethyl-2-pentene, geraniol, farnesol, 1-methylcyclohexene, 1-methylcyclopentene, dipentene, 1-p-menthene, 1-m-menthene, 6-m-menthene, 2-pinene, 2-carene, 3-carene, α-cedrene, 1-methylcycloheptene, 2-(4-methylcyclohex-3-en-1-yl)-6-methylheptan-4-one, α-terpineol and caryophyllene.

2. A process in accordance with claim 1 wherein a triphenylphosphite-ozone adduct is employed.

3. A process in accordance with claim 1 wherein a tris-(p-methoxyphenyl)phosphite-ozone adduct is employed.

4. A process in accordance with claim 1 wherein a tris-(p-nitrophenyl)phosphite-ozone adduct is employed.

5. A process in accordance with claim 1 wherein a tris-(p-chlorophenyl)phosphite-ozone adduct is employed.

6. A process in accordance with claim 1 wherein the inert solvent is selected from the group consisting of saturated hydrocarbons and saturated halogenated hydrocarbons.

References Cited
UNITED STATES PATENTS

| | | | |
|---|---|---|---|
| 3,061,646 | 10/1962 | Bartols | 260—610 B |
| 3,502,740 | 3/1970 | Zajacek et al. | 260—610 B |
| 3,510,537 | 5/1970 | Sheng et al. | 260—610 B |

OTHER REFERENCES

Thompson, "J. Amer. Chem. Soc.," vol. 183 (1961), pp. 845–851.

BERNARD HELFIN, Primary Examiner

W. B. LONE, Assistant Examiner

U.S. Cl. X.R.

260—610 B, 598, 514 B, 593 R, 566 A, 617 C, 632 R, 635 R, 631.5